US012074369B2

(12) United States Patent
Deng et al.

(10) Patent No.: US 12,074,369 B2
(45) Date of Patent: Aug. 27, 2024

(54) ANTENNA ASSEMBLY AND ELECTRONIC DEVICE

(71) Applicant: GUANGZHOU SHIYUAN ELECTRONIC TECHNOLOGY COMPANY LIMITED, Guangzhou (CN)

(72) Inventors: Bingjie Deng, Guangzhou (CN); Guofeng Hong, Guangzhou (CN)

(73) Assignee: GUANGZHOU SHIYUAN ELECTRONIC TECHNOLOGY COMPANY LIMITED, Guangzhou (CN)

( * ) Notice: Subject to any disclaimer, the term of this patent is extended or adjusted under 35 U.S.C. 154(b) by 147 days.

(21) Appl. No.: 17/846,308

(22) Filed: Jun. 22, 2022

(65) Prior Publication Data

US 2022/0320724 A1 Oct. 6, 2022

Related U.S. Application Data

(63) Continuation of application No. PCT/CN2020/128393, filed on Nov. 12, 2020.

(51) Int. Cl.
*H01Q 1/52* (2006.01)
*H01Q 1/22* (2006.01)

(52) U.S. Cl.
CPC ........... *H01Q 1/526* (2013.01); *H01Q 1/2283* (2013.01); *H01Q 1/528* (2013.01)

(58) Field of Classification Search
CPC ...... H01Q 1/526; H01Q 1/2283; H01Q 1/528; H01Q 1/2266; H01Q 1/523; H01Q 5/371;
(Continued)

(56) References Cited

U.S. PATENT DOCUMENTS 10,074,904 B2 * 9/2018 Tomonari ................. H04B 5/26
10,522,912 B2 * 12/2019 Komachi ............... H01Q 7/005
(Continued)

FOREIGN PATENT DOCUMENTS

CN 203339295 U * 12/2013
CN 207460737 U 6/2018
(Continued)

OTHER PUBLICATIONS

A Short Circuit Multi-frequency Space Micro-strip Antenna—CN203339295 U, Chen et al. (Year: 2013).*

*Primary Examiner* — Jany Richardson
(74) *Attorney, Agent, or Firm* — BAYES PLLC

(57) ABSTRACT

An antenna assembly and an electronic device are provided. The antenna assembly comprises a dielectric substrate; an antenna unit, arranged on a surface of the dielectric substrate; a radio frequency chip, arranged on a surface of the dielectric substrate, and connected with the antenna unit; and a metal shielding cover, arranged on another surface of the dielectric substrate facing away from the antenna unit, and coving the antenna unit. The electromagnetic interference to antenna unit caused by other electronic devices of electronic equipment can be isolated through the metal shielding cover, and the antenna unit and the radio frequency chip of the antenna assembly can be arranged on the same dielectric substrate, avoiding the use of a coaxial cable to connect the antenna unit and the radio frequency chip, thereby solving the problem of electromagnetic interference to and ensuring the radiation performance of the antenna unit.

20 Claims, 12 Drawing Sheets

(58) Field of Classification Search
CPC .......... H01Q 5/385; H01Q 9/42; H01Q 19/10; H01Q 21/28; H01Q 1/38; H01Q 1/46; H01P 1/38
See application file for complete search history.

(56) References Cited

U.S. PATENT DOCUMENTS

| | | | | |
|---|---|---|---|---|
| 11,114,748 B2 * | 9/2021 | Yarga | ..................... | H01Q 21/28 |
| 11,664,595 B1 * | 5/2023 | Wong | ..................... | H01Q 21/08<br>343/767 |
| 2012/0112982 A1 | 5/2012 | Huang | | |
| 2017/0331191 A1 * | 11/2017 | Komachi | ............... | H01Q 7/005 |
| 2019/0267718 A1 * | 8/2019 | Rajagopalan | .......... | H01Q 1/523 |
| 2021/0075090 A1 * | 3/2021 | Yarga | ..................... | H01Q 1/241 |
| 2021/0351503 A1 * | 11/2021 | Miyagawa | ............. | H01Q 23/00 |

FOREIGN PATENT DOCUMENTS

| | | | |
|---|---|---|---|
| CN | 110828978 | A | 2/2020 |
| CN | 210865410 | U | 6/2020 |
| CN | 210926315 | U | 7/2020 |
| EP | 0346125 | A2 | 12/1989 |

* cited by examiner

ANTENNA ASSEMBLY AND ELECTRONIC DEVICE

CROSS-REFERENCE TO RELATED APPLICATION

The present application is a continuation of International Application No. PCT/CN2020/128393, filed on Nov. 12, 2020, which is incorporated herein by reference in its entirety.

TECHNICAL FIELD

The present disclosure relates to the technical field of antennas, and in particular to an antenna assembly and an electronic device.

BACKGROUND

With the progress of science and technology, wireless communication technology is applied in most electronic devices. A wireless data transmission function in electronic devices needs supports of radio frequency equipment. A performance of the radio frequency equipment directly determines a communication mode capable of being supported by electronic devices and the strength stability of received signals.

As a unit for receiving and transmitting electromagnetic waves in radio frequency equipment, antennas cannot efficiently radiate electromagnetic waves in a whole electronic device due to interferences of a power supply, a display screen, a communication module on a main board, cables and other equipment. Meanwhile, electromagnetic waves of omnidirectional radiation of the antenna will also interfere with a performance of display screen and cause the display screen to flash, or interfere with other electronic devices in the electronic equipment.

In a conventional technology, interference sources other than antenna are mostly shielded, such as a power supply, a main board, a transmission module and other equipment. However, an interference noise will also interfere with a coaxial transmission line between the antenna and a radio frequency chip, or the interference noise will reflect and refract through a metal rear cover of the whole machine, and finally affect the antenna, which cannot fundamentally solve the problem that the antenna is interfered by radiation, and adding a metal shielding cover to the equipment other than the antenna will also increase assembly cost.

SUMMARY

An objective of embodiments of the present disclosure is to provide an antenna assembly and an electronic device, so as to solve a problem that the prior art cannot fundamentally solve problems of radiation interference to the antenna and high assembly cost.

In order to achieve this objective, embodiments of the present disclosure adopt the following technical solution:

A first aspect provides an antenna assembly, comprising:

a dielectric substrate;

an antenna unit, being arranged on a surface of the dielectric substrate;

a radio frequency chip, being arranged on a surface of the dielectric substrate, and connected with the antenna unit; and a metal shielding cover, being arranged on a surface of the dielectric substrate facing away from the antenna unit, and coving the antenna unit.

In a second aspect, an embodiment of the present disclosure provides an electronic device, the electronic device includes a display screen, a frame arranged around the display screen, and an antenna assembly according to the first aspect, the antenna assembly is located in the electronic device and connected with the frame, wherein a surface of the dielectric substrate in the antenna assembly without the metal shielding cover faces the frame.

For the antenna assembly of embodiments of the present disclosure, the antenna unit and the radio frequency chip are arranged on the same dielectric substrate and are provided with a metal shielding cover. Firstly, the metal shielding cover is arranged on the surface of the dielectric substrate facing away from the antenna unit and covers the antenna unit, which can isolate, through the metal shielding cover, electromagnetic interference to the antenna unit caused by other electronic equipment of the electronic device. Secondly, the antenna unit and the radio frequency chip are arranged on the same dielectric substrate, which avoids the use of a coaxial cable to connect the antenna unit and the radio frequency chip, thereby fundamentally solving the problem of electromagnetic interference to the antenna unit and ensuring the radiation performance of the antenna unit. Thirdly, the metal shielding cover is arranged on the surface of the dielectric substrate facing away from the antenna unit, and after the antenna assembly is installed on the electronic device, the electromagnetic wave radiated by the antenna unit to a direction of the metal shielding cover is shielded by the metal shielding cover, and the electromagnetic wave radiated by the antenna unit radiates to the outside of the electronic device. Thus, the electromagnetic wave radiated by the antenna unit will not interfere with the display screen and cause the display screen to flash, nor will it interfere with other electronic equipment inside the electronic device. Finally, other electronic equipment in electronic devices does not need to be equipped with shielding covers, which reduces the manufacturing cost of electronic device.

BRIEF DESCRIPTION OF THE DRAWINGS

The present disclosure will be described in further detail hereinafter according to the accompanying drawings and embodiments.

In drawings.

Figure 1:
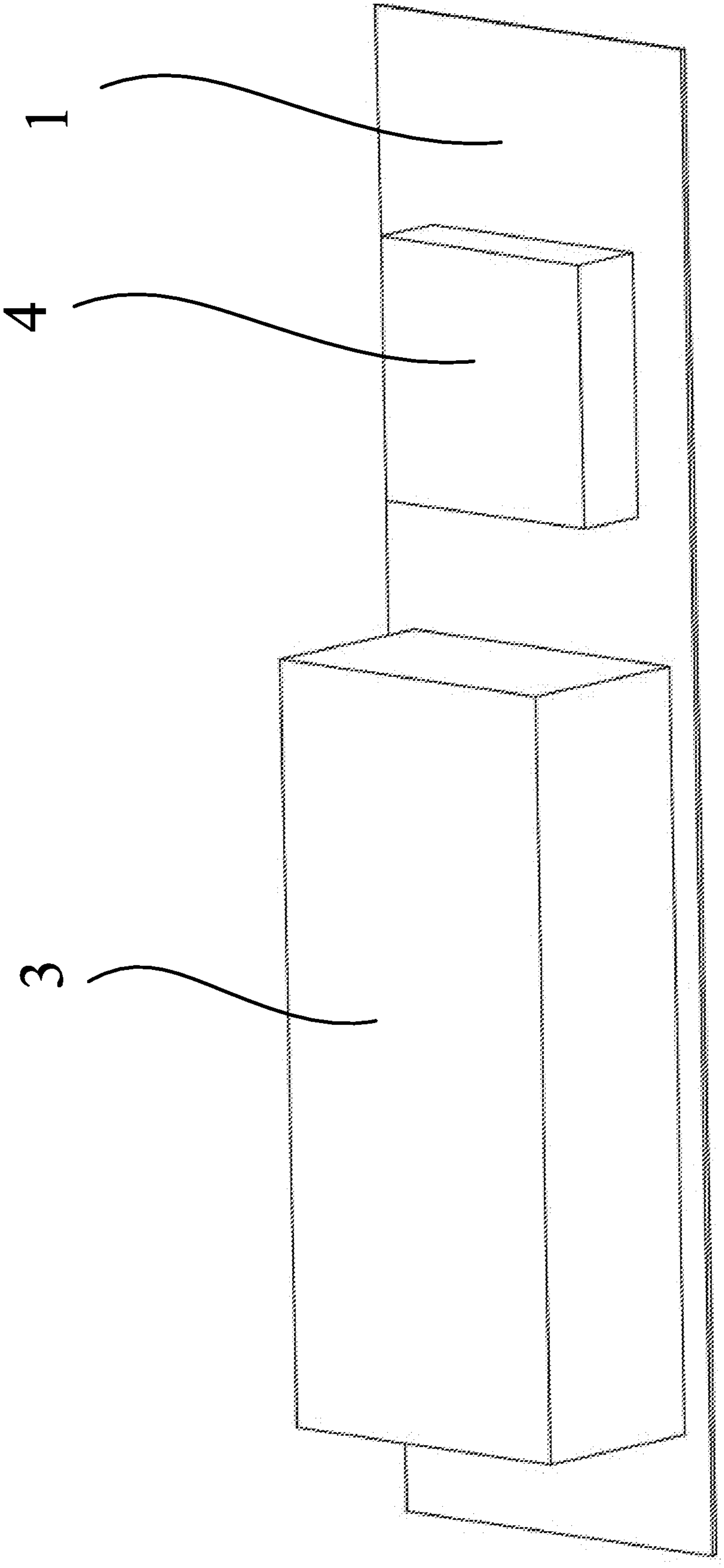
FIG. 1 is a schematic diagram of an overall structure of an antenna assembly according to an embodiment of the present disclosure.

1. Dielectric substrate, 2. Antenna unit, 21. First antenna unit, 211. First feeding stub, 212. First short-circuited stub, 213. First stub; 214. L-shaped stub, 215. First parasitic stub, 22. Second antenna unit, 221. Main body; 222. Second short-circuited stub, 223. Second feeding stub, 224. Second stub, 225. Third stub, 226. Second parasitic stub, 227. Fourth stub, 228. L-shaped fed, 23. Third antenna unit, 24. Fourth antenna unit, 3. Metal shielding cover, 4. Radio frequency chip, 41. First radio frequency chip, 42. Second radio frequency chip, 5. Coplanar waveguide transmission line, 51. First coplanar waveguide fed, 52. First coplanar waveguide ground plane, 53. Second coplanar waveguide fed, 54. Second coplanar waveguide ground plane, 55. Third coplanar waveguide fed, 56. Fourth coplanar waveguide fed, 6. Shielding ground plane, 7. Ground plane, 8. Metal via, 100. Electronic device, 101. Display screen, 102. Frame, 1021. Lower frame, 10211. Pocket hole, 103. Antenna assembly, 104. Decorative part.

DETAILED DESCRIPTION

In order to make clearer the technical problems to be solved, the technical solutions to be adopted and the technical effects to be achieved by the present disclosure, the technical solutions of embodiments of the present disclosure will be further described in detail hereinafter in combination with the accompanying drawings. The described embodiments are only a part of embodiments of the present disclosure, not all of the embodiments of the present disclosure. Based on the embodiments of the present disclosure, all other embodiments obtained by those skilled in the art without creative work belong to the claimed scope of the present disclosure.

In the description of the present disclosure, unless otherwise specified and limited, the terms "connected with," "connected," and "fixed" should be interpreted broadly. For example, they can be fixedly connected, detachably connected, or integrated. Or, it can be a mechanical connection or an electrical connection. Or, it can be directly connected or indirectly connected through an intermediate medium. Or, it can be the connection between two components or the interaction relationship between two components. For those skilled in the art, the concrete meaning of the above-mentioned terms in the present disclosure can be understood under concrete circumstances.

In the present disclosure, unless expressly stipulated and defined otherwise, a first feature being "above" or "below" a second feature may include that the first feature directly contacts with the second feature, or may include that the first feature does not directly contact with the second feature, rather than contact through another feature therebetween. Moreover, the first feature being "above," "over," or "on" the second feature may include that the first feature is directly above and obliquely above the second feature, or simply means that the level of the first feature is higher than that of the second feature. The first feature being "below," "under," and "underneath" the second feature includes that the first feature is directly below and obliquely below the second feature, or simply means that the level of the first feature is smaller than that of the second feature.

Figure 2:
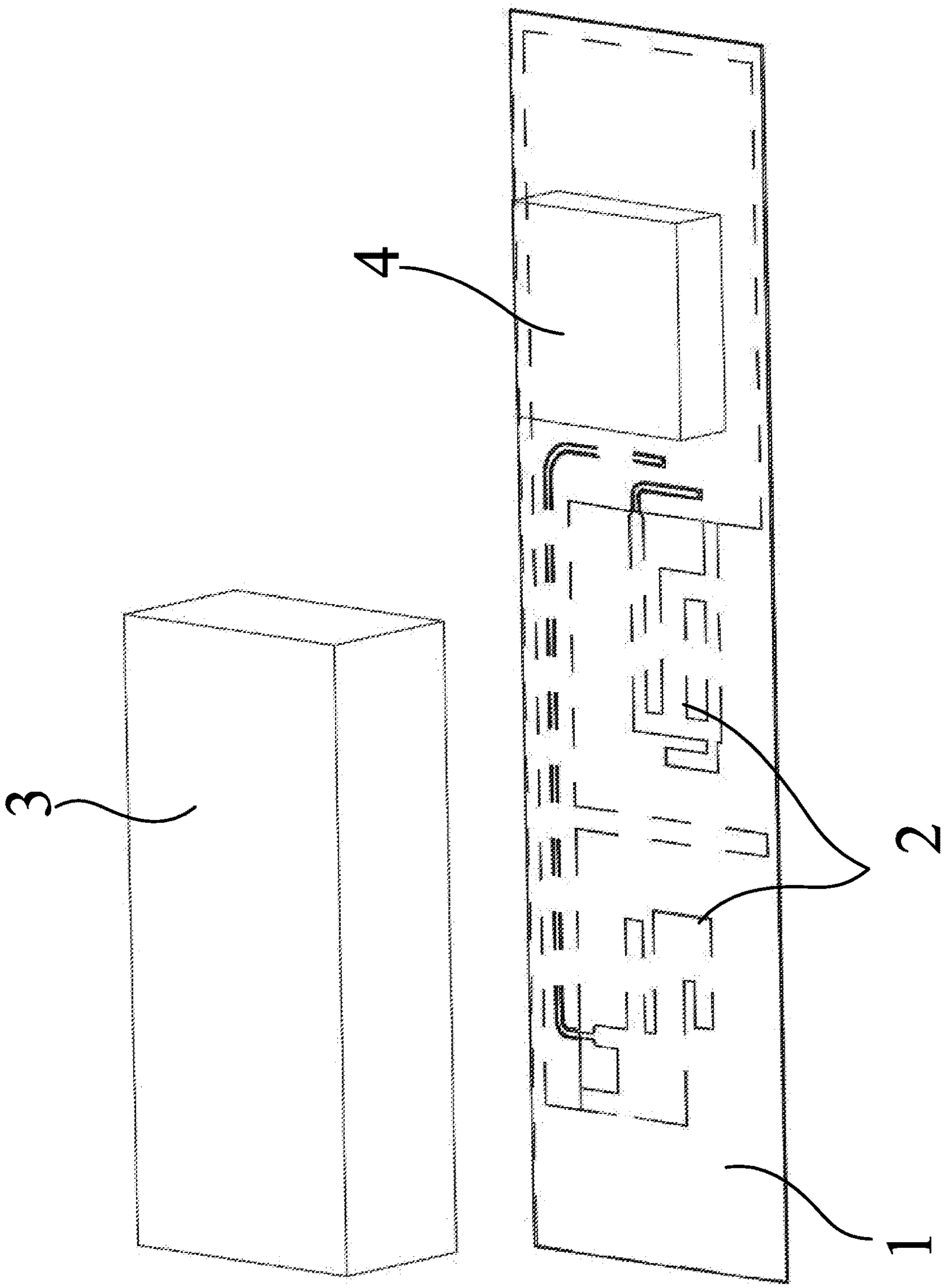
FIG. 2 is a schematic diagram of an exploded structure of an antenna assembly according to the embodiment of the present disclosure.

As shown in FIGS. 1 and 2, an antenna assembly according to an embodiment of the present disclosure includes a dielectric substrate 1, an antenna unit 2, a radio frequency chip 4, and a metal shielding cover 3. The antenna unit 2 and the radio frequency chip 4 are arranged on a surface of the dielectric substrate 1, the antenna unit 2 and the radio frequency chip 4 are connected through a transmission line, and the metal shielding cover 3 is arranged on a surface of the dielectric substrate 1 facing away from the antenna unit 2.

Thereinto, the dielectric substrate 1 may be a PCB board of the antenna assembly, the antenna unit 2 may be a unit that radiates electromagnetic waves, and the antenna unit 2 may be a metal sheet with a preset shape printed on the surface of the dielectric substrate 1, for example, a copper sheet with various shapes printed on the surface of the dielectric substrate 1. Thereinto, the antenna unit 2 may be electrically connected with the radio frequency chip 4 through a transmission line. For example, an electrical connection between the antenna unit 2 and the radio frequency chip 4 is realized through a transmission line printed on the dielectric substrate 1. The metal shielding cover 3 can be a cover body obtained by stamping a plate of metal materials such as stainless steel and galvanized steel. The metal shielding cover 3 can cover the antenna unit 2 and is provided with an opening for the antenna unit 2 to radiate and receive electromagnetic waves.

Figure 3:
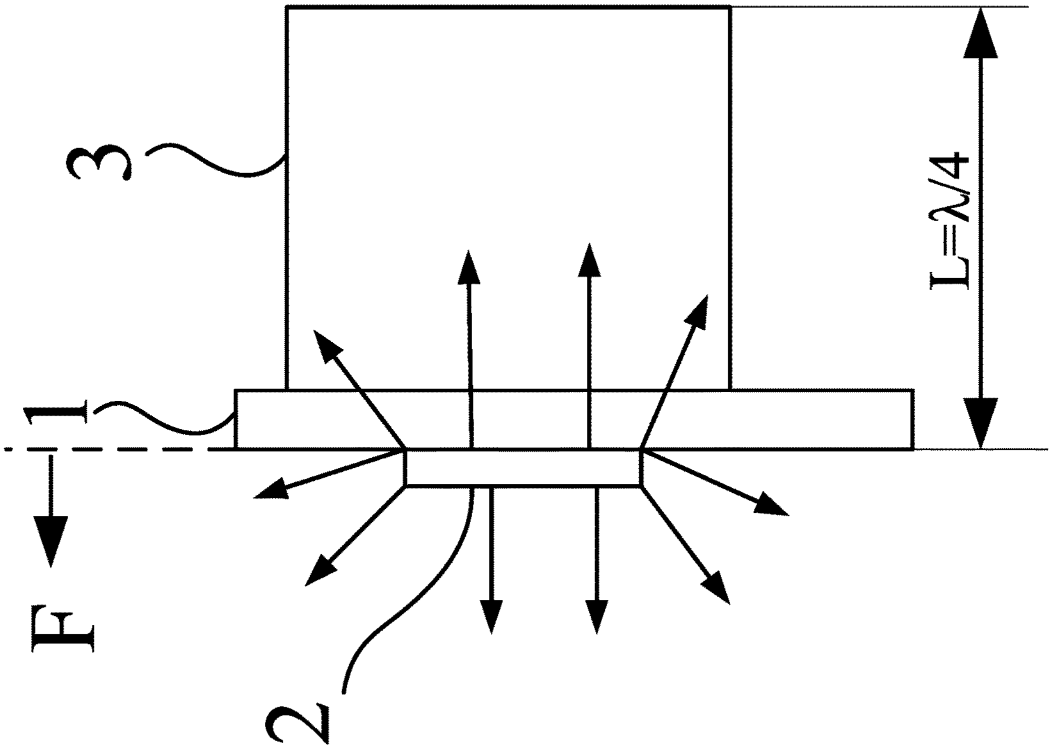
FIG. 3 is a schematic diagram of positions of an antenna unit and a metal shielding cover in the embodiment of the present disclosure.

As shown in FIG. 3, in an embodiment of the present disclosure, the antenna unit 2 can radiate electromagnetic wave in all directions. The whole antenna assembly finally requires electromagnetic waves to radiate on a side of the dielectric substrate 1 provided with the antenna unit 2 (Side F in FIG. 3). As shown in FIG. 3, the metal shielding cover 3 can be arranged on a surface of the dielectric substrate 1 facing away from the antenna unit 2 and cover the antenna unit 2, so that the electromagnetic wave radiated by the antenna unit 2 radiates in a direction of a side of the dielectric substrate 1 provided with the antenna unit 2 (Side F in FIG. 3). The electromagnetic wave radiated by the antenna unit 2 to the metal shielding cover 3 is shielded by the metal shielding cover 3. The metal shielding cover 3 will not affect the antenna unit 2 to radiate the electromagnetic wave, but also avoid the electromagnetic interference of other electronic equipment to the antenna unit 2, and avoid the electromagnetic interference to other electronic equipment when the antenna unit 2 radiates the electromagnetic waves. In addition, the antenna unit 2 and the radio frequency chip 4 are arranged on the same dielectric substrate 1 without using a coaxial cable to connect the antenna unit 2 and the radio frequency chip 4, which fundamentally solves a problem that when the coaxial cable is used, the antenna unit 2 is subject to electromagnetic interference. Moreover, other electronic equipment does not need to add shielding covers, which reduces the use and installation process of shielding covers and reduces the manufacturing cost of electronic devices.

For the antenna assembly of embodiments of the present disclosure, the antenna unit and the radio frequency chip are arranged on the same dielectric substrate and are provided with a metal shielding cover. Firstly, the metal shielding cover is arranged on the surface of the dielectric substrate facing away from the antenna unit and covers the antenna unit, which can isolate, through the metal shielding cover, electromagnetic interference to the antenna unit caused by other electronic equipment of the electronic device. Secondly, the antenna unit and the radio frequency chip are arranged on the same dielectric substrate, which avoids the use of a coaxial cable to connect the antenna unit and the radio frequency chip, thereby fundamentally solving the problem of electromagnetic interference to the antenna unit and ensuring the radiation performance of the antenna unit. Thirdly, the metal shielding cover is arranged on the surface of the dielectric substrate facing away from the antenna unit, and after the antenna assembly is installed on the electronic device, the electromagnetic wave radiated by the antenna unit to a direction of the metal shielding cover is shielded by the metal shielding cover, and the electromagnetic wave radiated by the antenna unit radiates to the outside of the electronic device. Thus, the electromagnetic wave radiated by the antenna unit will not interfere with the display screen and cause the display screen to flash, nor will it interfere with other electronic equipment inside the electronic device. Finally, other electronic equipment in electronic devices does not need to be equipped with shielding covers, which reduces the manufacturing cost of electronic device.

In an embodiment of the present disclosure, the number of antenna units 2 can be one or more, and the antenna unit 2 and the radio frequency chip 4 can be connected through a microstrip transmission line or a coplanar waveguide transmission line, wherein the microstrip transmission line can be suitable for a circuit with a relatively narrow bandwidth of the microwave band, and the circuit structure of the microstrip transmission line is simple, which is insensitive to the processing technology and the thickness and thickness difference of copper layer, and has a low manufacturing cost. The grounded coplanar waveguide transmission line has a good anti-interference performance and relatively low radiation loss in high frequency band, and is able to achieve good suppression of high order modes, which makes the grounded coplanar waveguide transmission line suitable for transmission in high frequency band of 30 GHz and above.

In one embodiment, the microstrip transmission line or the coplanar waveguide transmission line can be further provided with an impedance matching circuit, for example, a it-type matching circuit. By arranging the impedance matching circuit, a frequency of the antenna assembly can be adjusted after the frequency deviation, and furthermore, the antenna assembly can be matched with an active device so as to enhance the overall radiation performance of the antenna assembly.

In another embodiment, the antenna unit 2 and the radio frequency chip 4 can be arranged on different surfaces of the dielectric substrate 1, and the radio frequency chip 4 can be connected with the transmission line through a metal via, which can make full use of the space on both surfaces of the dielectric substrate 1 to arrange the radio frequency chip 4 and the antenna unit 2, thereby reducing an area of the dielectric substrate 1, and being applicable to a scene where the space of the whole electronic device is limited, so that the antenna unit 2 and the radio frequency chip 4 cannot be arranged on the same surface of the dielectric substrate 1.

Obviously, the antenna unit 2 and the radio frequency chip 4 can also be arranged on the same surface of the dielectric substrate 1. Pins of the radio frequency chip 4 can be directly connected with the transmission line without arranging a metal via on the dielectric substrate 1, which reduces the manufacturing cost of the dielectric substrate 1, and meanwhile, it is also applicable to a scene where the antenna unit 2 and the radio frequency chip 4 are arranged on the same surface of the dielectric substrate 1 due to a limited space on the whole electronic device. In practical application, those skilled in the art can arrange the antenna unit 2 and the radio frequency chip 4 on the same surface or on different surfaces according to the actual needs, which is not limited by the embodiment of the present disclosure.

In practical application, the metal shielding cover 3 can be connected with the dielectric substrate 1 by welding, buckle, locking screw, etc. In one embodiment, the contact surface between the metal shielding cover 3 and the dielectric substrate 1 can further be provided with conductive fabric so as to improve the electromagnetic shielding performance of the metal shielding cover 3.

In an embodiment, a distance from a bottom portion of the metal shielding cover 3 to the antenna unit 2 is equal to one fourth of a wavelength of the electromagnetic wave radiated by the antenna unit 2. As shown in FIG. 3, $L=\lambda/4$, wherein L is a distance from the bottom portion of the metal shielding cover 3 to the antenna unit 2, $\lambda$ is a wavelength of the electromagnetic wave. Thus, when reaching the bottom portion of the metal shielding cover 3, the electromagnetic wave radiated by the antenna unit 2 is reflected and changes a propagation direction. A phase of the electromagnetic wave after one reflection is reversed by 180°. A phase change of the electromagnetic wave corresponding to a quarter wavelength path is 90°, and a phase after two changes of the two quarter paths is reversed 180° in total. In addition, after another reflection, the phase of the electromagnetic wave is further reversed by 180°, realizing a 360° phase reversal of the electromagnetic wave. The phase of the electromagnetic wave reaching the antenna unit 2 after reflection is consistent with the phase of the forward radiation of the antenna unit 2, so as to form the effect of directional radiation.

Hereinafter, a structure of the antenna unit 2 and a routing of the transmission line in the embodiment of the present disclosure will be described by taking an example in which the number of antenna units 2 are two and a coplanar waveguide transmission line serves as the transmission line.

Figure 4:
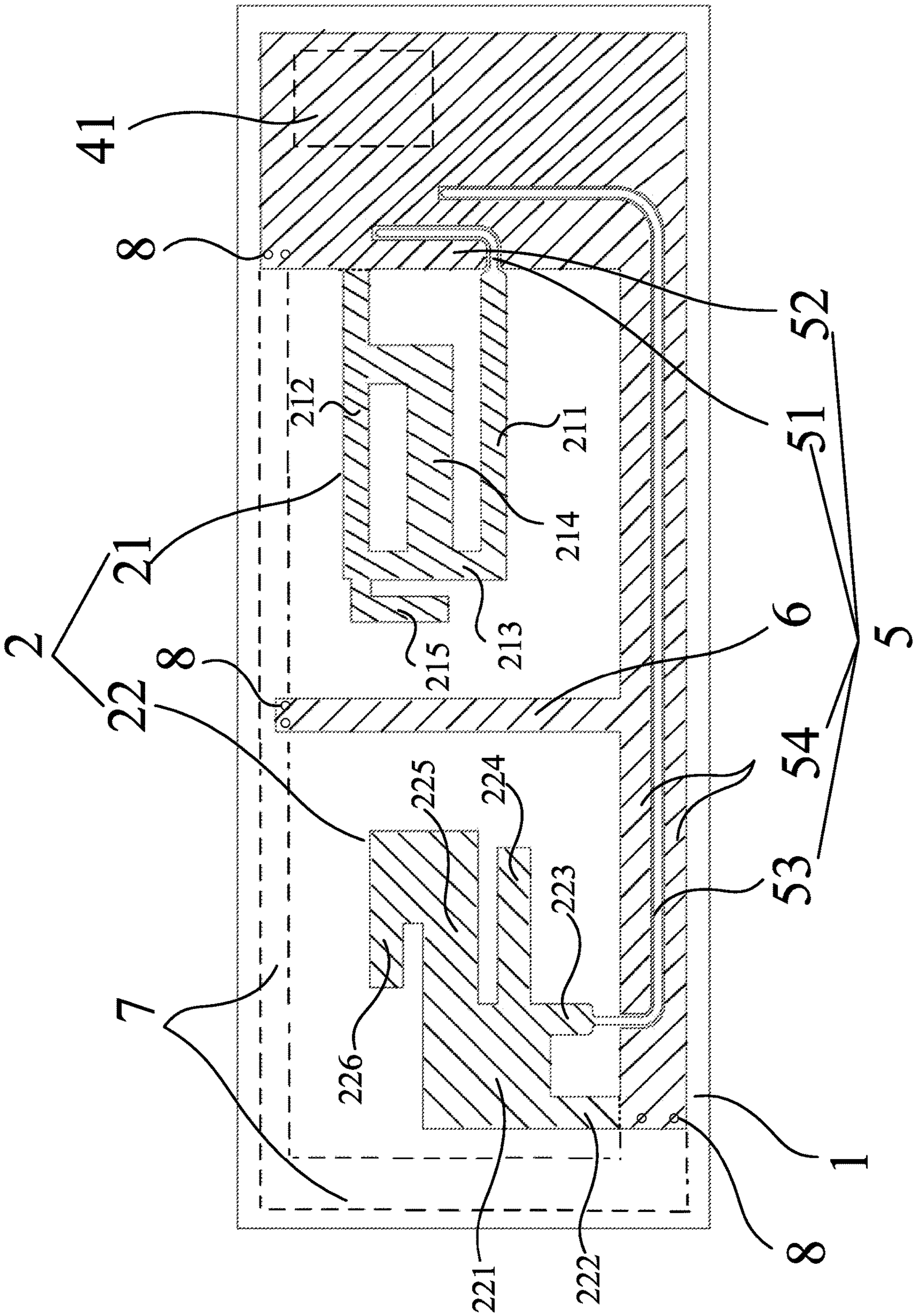
FIG. 4 is a schematic diagram of a connection between the antenna unit and a transmission line in the embodiment of the present disclosure.
Figure 5:
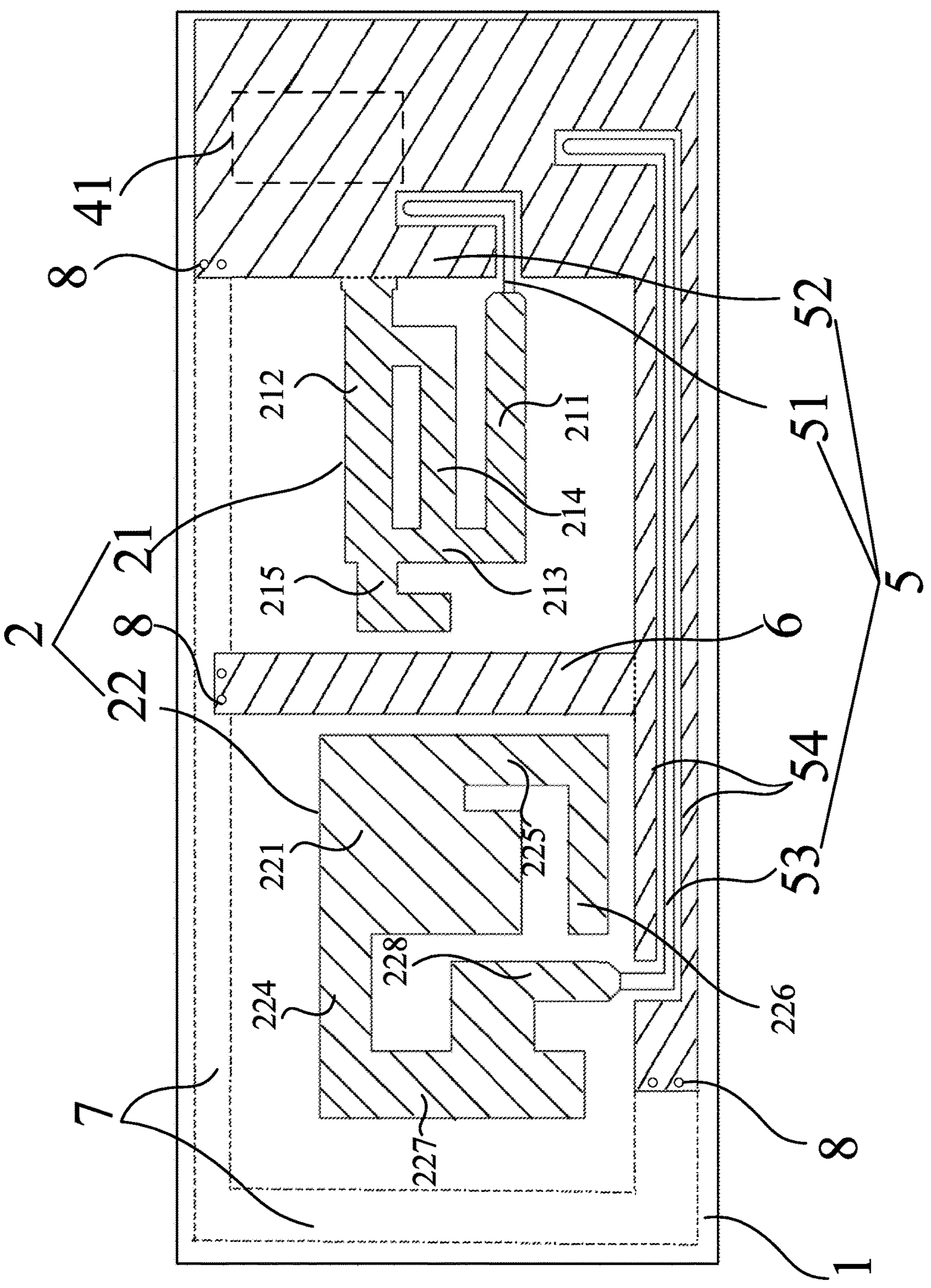
FIG. 5 is a schematic diagram of a connection between an antenna unit and a transmission line in another embodiment of the present disclosure.

As shown in FIGS. 4 and 5, in one example, a coplanar waveguide transmission line 5 is provided on a surface of the dielectric substrate 1 provided with the antenna unit 2, and the antenna unit 2 and the first radio frequency chip 41 are connected through the coplanar waveguide transmission line 5. Thereinto, the coplanar waveguide transmission line 5 includes a coplanar waveguide fed (51, 53) and a coplanar waveguide ground plane (52, 54) located on both sides of the coplanar waveguide fed (51, 53). The antenna unit 2 is connected with the first radio frequency chip 41 through the coplanar waveguide fed (51, 53). The coplanar waveguide ground plane (52, 54) may be a metal layer arranged on the dielectric substrate 1, such as copper. In one embodiment, the coplanar waveguide ground plane (52, 54) is connected as a whole, and the coplanar waveguide ground plane (52, 54) is connected to a ground plane 7 on the other surface of the dielectric substrate 1 through the metal via 8 on the dielectric substrate 1. Thereinto, the metal via 8 connecting the coplanar waveguide ground plane (52, 54) and the ground plane 7 can be arranged according to the actual situation, which is not limited in the embodiment of the present disclosure.

As shown in FIGS. 4 and 5, in an example, the antenna unit 2 includes a first antenna unit 21 and a second antenna unit 22, the coplanar waveguide fed includes a first coplanar waveguide fed 51 and a second coplanar waveguide fed 53, and the coplanar waveguide ground plane includes a first coplanar waveguide ground plane 52 located on both sides of the first coplanar waveguide fed 51, and a second coplanar waveguide ground plane 54 located on both sides of the second coplanar waveguide fed 53, wherein both the first coplanar waveguide fed 51 and the second coplanar waveguide fed 53 are provided with impedance matching circuits.

As shown in FIGS. 4 and 5, the first antenna unit 21 and the second antenna unit 22 are located on a same side of the first radio frequency chip 41. The first antenna unit 21 is located between the second antenna unit 22 and the first radio frequency chip 41, the first antenna unit 21 is connected with the first radio frequency chip 41 through the first coplanar waveguide fed 51, and the first antenna unit 21 is grounded through the first coplanar waveguide ground plane 52. The second antenna unit 22 is connected with the first radio frequency chip 41 through the second coplanar waveguide fed 53, and when the second antenna unit 22 needs to be grounded, the second antenna unit 22 can be grounded through the second coplanar waveguide ground plane 54.

It should be noted that when the first radio frequency chip 41 and the antenna unit 2 are arranged on the same surface of the dielectric substrate 1, the pins of the first radio frequency chip 41 can be directly connected with the first coplanar waveguide fed 51 and the second coplanar waveguide fed 53. When the first radio frequency chip 41 and the antenna unit 2 are arranged on different surfaces of the dielectric substrate 1, the pins of the first radio frequency chip 41 can be connected with the first coplanar waveguide fed 51 and the second coplanar waveguide fed 53 through a metal via.

As shown in FIGS. 4 and 5, in an example of the present disclosure, the first coplanar waveguide fed 51 is located on a side of the first antenna unit 21 close to the first radio frequency chip 41 and perpendicular to a bottom side of the dielectric substrate 1. The first antenna unit 21 includes a first feeding stub 211 and a first short-circuited stub 212 that are perpendicular to the first coplanar waveguide fed 51. The first short-circuited stub 212 and the first feeding stub 211 have an equal length, and are parallel and spaced apart. The first short-circuited stub 212 is connected to the first coplanar waveguide ground plane 52, and the first feeding stub 211 is connected with the first coplanar waveguide fed 51. The first short-circuited stub 212 is connected with an end of the first feeding stub 211 away from the first coplanar waveguide fed 51 through a first stub 213. An L-shaped stub 214 is further arranged between the first short-circuited stub 212 and the first feeding stub 211, an end of the L-shaped stub 214 is perpendicularly connected to the first short-circuited stub 212, and the other end of the L-shaped stub 214 is perpendicularly connected to the first stub 213. The first short-circuited stub 212 is further provided with a first parasitic stub 215, and the first parasitic stub 215 is perpendicular to the first short-circuited stub 212, and is parallel to and spaced apart from the first stub 213. The first parasitic stub 215 extends from an end of the first short-circuited stub 212 away from the first coplanar waveguide fed 51 to a direction of the bottom side of the dielectric substrate.

It should be noted that although the structure of the first antenna unit 21 is illustrated in combination with FIGS. 4 and 5, in practical application, those skilled in the art can also arrange the first antenna unit 21 with any structure. The example of the present disclosure does not limit the structure of the first antenna unit 21, nor does it limit the connection mode between the first antenna unit 21 and the coplanar waveguide transmission lines.

As shown in FIG. 4, in an example, the second coplanar waveguide fed 53 is parallel to the bottom side of the dielectric substrate 1, wherein the bottom side can be any side of the square dielectric substrate 1. As shown in FIG. 4, the dielectric substrate 1 is a rectangle, and a long side of the rectangle is the bottom side.

In FIG. 4, the second antenna unit 22 includes a square main body 221. The main body 221 is provided with a second short-circuited stub 222 extending to the second coplanar waveguide ground plane 54, and a second feeding stub 223 extending to the second coplanar waveguide fed 53. The second short-circuited stub 222 and the second feeding stub 223 are parallel and spaced apart, the second short-circuited stub 222 is arranged away from the first radio frequency chip 41, and the second feeding stub 223 is arranged close to the first radio frequency chip 41. The main body 221 is further provided with a second stub 224 and a third stub 225 that extend from the main body 221 to the first antenna unit 21. The second stub 224 and the third stub 225 are parallel and spaced apart. The second stub 224 is arranged close to the second coplanar waveguide fed 53. The third stub 225 is arranged away from the second coplanar waveguide fed 53. The third stub 225 is provided with a second parasitic stub 226. The second parasitic stub 226 is located on a side of the third stub 225 away from the second coplanar waveguide fed 53, and is parallel to and spaced apart from the third stub 225. The second parasitic stub 226 extends from an end of the third stub 225 away from the main body 221 to the direction of the main body 221.

As shown in FIG. 5, in another example, the second coplanar waveguide fed 53 is parallel to a bottom side of the dielectric substrate 1. The second antenna unit 22 includes a square main body 221. Two corners of the main body 221 away from an end of the second coplanar waveguide fed 53 are respectively provided with a second stub 224 and a third stub 225. The second stub 224 is located on a side of the main body 221 away from the first radio frequency chip 41. The third stub 225 is located on a side of the main body 221 close to the first radio frequency chip 41. The second stub 224 is parallel to the second coplanar waveguide fed 53 and extends from the main body 221 to a direction away from the main body 221. The third stub 225 is perpendicular to the second coplanar waveguide fed 53 and extends towards a direction of the second coplanar waveguide fed 53. An end of the second stub 224 away from the main body 221 is provided with a fourth stub 227 extending to the second coplanar waveguide fed 53. The fourth stub 227 is further provided with an L-shaped fed 228, and the L-shaped fed 228 is located between the fourth stub 227 and the main body 221. An end of the L-shaped fed 228 is connected with the fourth stub 227, and the other end is connected with the second coplanar waveguide fed 53. An end of the third stub 225 close to the second coplanar waveguide fed 53 is provided with a second parasitic stub 226. The second parasitic stub 226 extends from the end of the third stub 225 close to the second coplanar waveguide fed 53 to an end away from the first radio frequency chip 41, and the second parasitic stub 226 is parallel to the second stub 224.

It should be noted that although the structure of the second antenna unit 22 is illustrated in combination with FIGS. 4 and 5, in practical application, those skilled in the art can also arrange the second antenna unit 22 with any structure. For example, the structure of the second antenna unit 22 can be the same as that of the first antenna unit 21. The example of the present disclosure does not limit the structure of the second antenna unit 22.

As shown in FIGS. 4 and 5, in an embodiment, a shielding ground plane 6 is further arranged between the first antenna unit 21 and the second antenna unit 22. An end of the shielding ground plane 6 is connected to the coplanar waveguide ground plane (52, 54), and the other end is connected to the ground plane 7 which is on the other surface of the dielectric substrate 1 through the metal via 8 on the dielectric substrate 1. The isolation between the first antenna unit 21 and the second antenna unit 22 can be improved through the shielding ground plane 6.

Although the above example illustrates the structure of the antenna unit 2 and the structure and routing of the transmission line, in which the antenna unit 2 includes two antenna units and the transmission line is a coplanar waveguide transmission line, in practical application, those skilled in the art can, according to actual needs, set the number of antenna units 2, design antenna units with different structures, and lay out different transmission lines. The embodiments of the present disclosure do not limit the number and structure of antenna units, nor do they limit the structure and routing mode of transmission lines.

Figure 6:
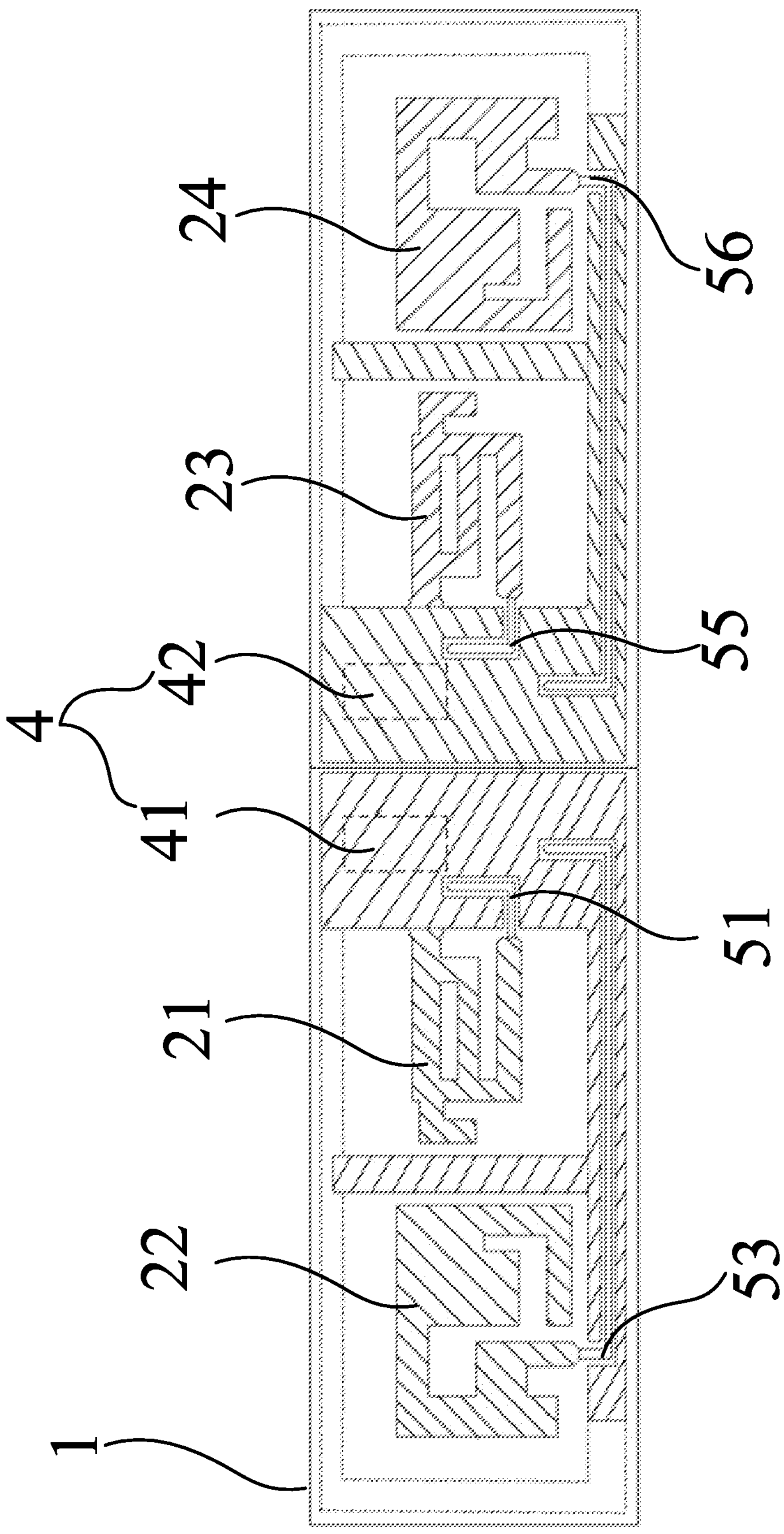
FIG. 6 is a schematic diagram of a connection between an antenna unit and a transmission line in another embodiment of the present disclosure.

FIG. 6 is a schematic diagram of another antenna assembly in an example according to the present disclosure. In addition to the first antenna unit 21, the second antenna unit 22 and the first radio frequency chip 41 shown in FIG. 4 or FIG. 5, the antenna assembly of the embodiment of the present disclosure further includes a third antenna unit 23 and a fourth antenna unit 24, the radio frequency chip 4 further includes a second radio frequency chip 42, and the coplanar waveguide fed further includes a third coplanar waveguide fed 55 and a fourth coplanar waveguide fed 56. Thereinto, the second radio frequency chip 42 is located on a side of the first radio frequency chip 41 away from the first antenna unit 21, and the third antenna unit 23 and the fourth antenna unit 24 are located on a side of the second radio frequency chip 42 away from the first radio frequency chip 41. The third antenna unit 23 is located between the second radio frequency chip 42 and the fourth antenna unit 24. The third antenna unit 23 and the first antenna unit 21 are mirror images of each other, and the fourth antenna unit 24 and the second antenna unit 22 are mirror images of each other. The third antenna unit 23 is connected with the second radio frequency chip 42 through the third coplanar waveguide fed 55. The fourth antenna unit 24 is connected with the second radio frequency chip 42 through the fourth coplanar waveguide fed 56. Thereinto, being mirror images of each other may mean that the third antenna unit 23 and the first antenna unit 21 are structurally mirror images of each other, and the fourth antenna unit 24 and the second antenna unit 22 are structurally mirror images of each other. Obviously, the structures of the third antenna unit 23 and the fourth antenna unit 24 can also be other structures, which are not limited in the embodiments of the present disclosure.

The antenna assembly of an embodiment of the present disclosure includes the first antenna unit 21, the second antenna unit 22, the third antenna unit 23, the fourth antenna unit 24, the first radio frequency chip 41, and the second radio frequency chip 42. The second radio frequency chip 42 is located on the side of the first radio frequency chip 41 away from the first antenna unit 21. The third antenna unit 23 and the fourth antenna unit 24 are located on the side of the second radio frequency chip 42 away from the first radio frequency chip 41, and the third antenna unit 23 is located between the second radio frequency chip 42 and the fourth antenna unit 24. For one thing, the antenna assembly includes a first group of antennas units (the first antenna unit 21 and the second antenna unit 22) and a second group of antenna units (the third antenna unit 23 and the fourth antenna unit 24), which can realize a wireless Access Point (AP) function. Moreover, there are two radio frequency chips (the first radio frequency chip 41 and the second radio frequency chip 42) between the first group of antennas units (the first antenna unit 21 and the second antenna unit 22) and the second group of antenna units (the third antenna unit 23 and the fourth antenna unit 24). The distance between the two groups of antennas is large, the isolation of the two groups of antennas is high, and the area of the whole antenna assembly is small.

Figure 7:
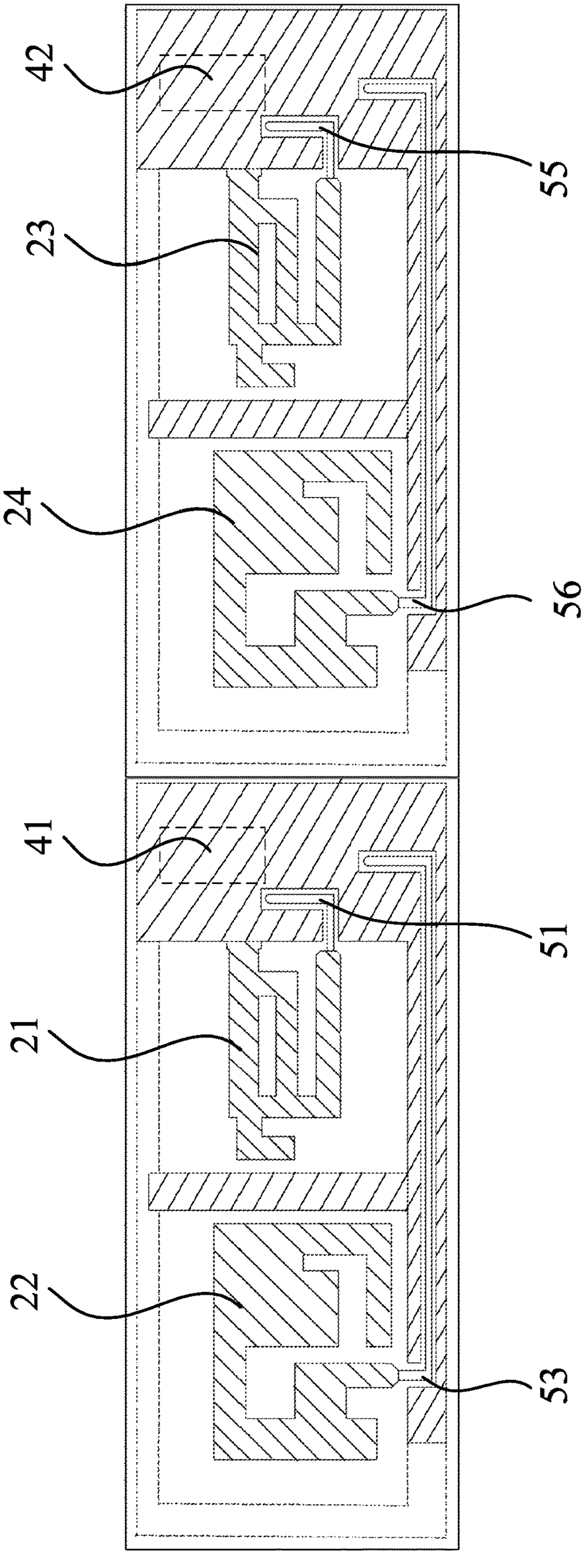
FIG. 7 is a schematic diagram of a connection between an antenna unit and a transmission line in still another embodiment of the present disclosure.

FIG. 7 is a schematic diagram of another antenna assembly according to the embodiment of the present disclosure. In addition to the first antenna unit 21, the second antenna unit 22, and the first radio frequency chip 41 shown in FIG. 4 or FIG. 5, the antenna assembly of the embodiment of the present disclosure further includes a third antenna unit 23 and a fourth antenna unit 24, the radio frequency chip 4 further includes a second radio frequency chip 42, and the coplanar waveguide fed further includes a third coplanar waveguide fed 55 and a fourth coplanar waveguide fed 56. Thereinto, the second radio frequency chip 42 is located on a side of the first radio frequency chip 41 away from the first antenna unit 21. The third antenna unit 23 and the fourth antenna unit 24 are located between the second radio frequency chip 42 and the first radio frequency chip 41. The third antenna unit 23 has the same structure as the first antenna unit 21, and the fourth antenna unit 24 has the same structure as the second antenna unit 22. The third antenna unit 23 is located between the second radio frequency chip 42 and the fourth antenna unit 24. The third antenna unit 23 is connected with the second radio frequency chip 42 through the third coplanar waveguide fed 55. The fourth antenna unit 24 is connected with the second radio frequency chip 42 through the fourth coplanar waveguide fed 56. Obviously, the structures of the third antenna unit 23 and the fourth antenna unit 24 can also be other structures, which are not limited in the embodiment of the present disclosure.

The antenna assembly of an embodiment of the present disclosure includes the first antenna unit 21, the second antenna unit 22, the third antenna unit 23, the fourth antenna unit 24, the first radio frequency chip 41, and the second radio frequency chip 42. The second radio frequency chip 42 is located on the side of the first radio frequency chip 41 away from the first antenna unit 21. The third antenna unit 23 and the fourth antenna unit 24 are located between the second radio frequency chip 42 and the first radio frequency chip 41. For one thing, the antenna assembly includes a first group of antennas units (the first antenna unit 21 and the second antenna unit 22) and a second group of antenna units (the third antenna unit 23 and the fourth antenna unit 24), which can realize a wireless AP function. Moreover, by increasing a distance between the first group of antennas units (the first antenna unit 21 and the second antenna unit 22) and the second group of antenna units (the third antenna unit 23 and the fourth antenna unit 24), the isolation of the two groups of antennas is increased, and the area of the dielectric substrate is increased, which is applicable to a scene where the installation space of antenna assembly is not limited.

Figure 8:
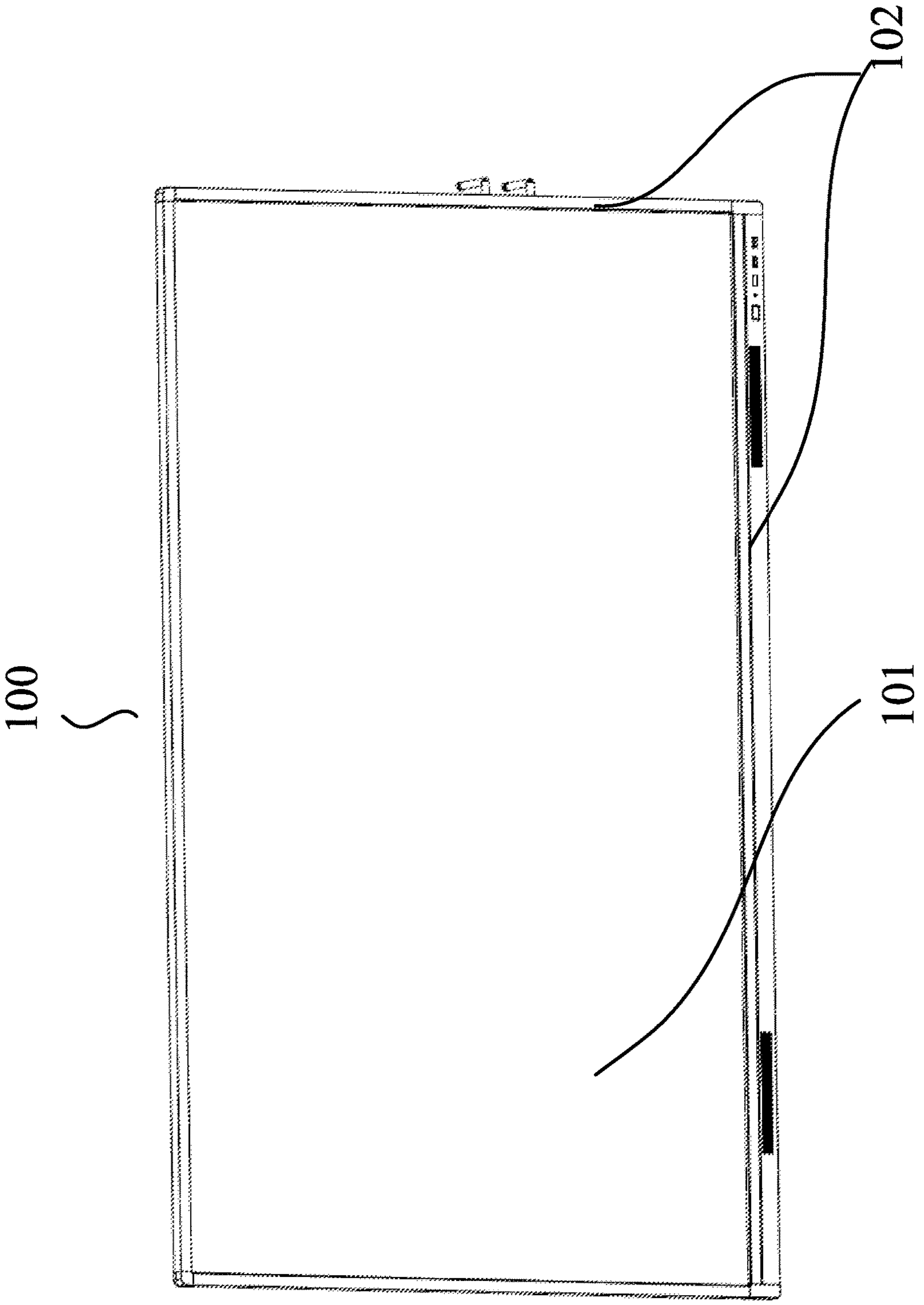
FIG. 8 is a schematic diagram of a front structure of an electronic device in the present disclosure.
Figure 9:
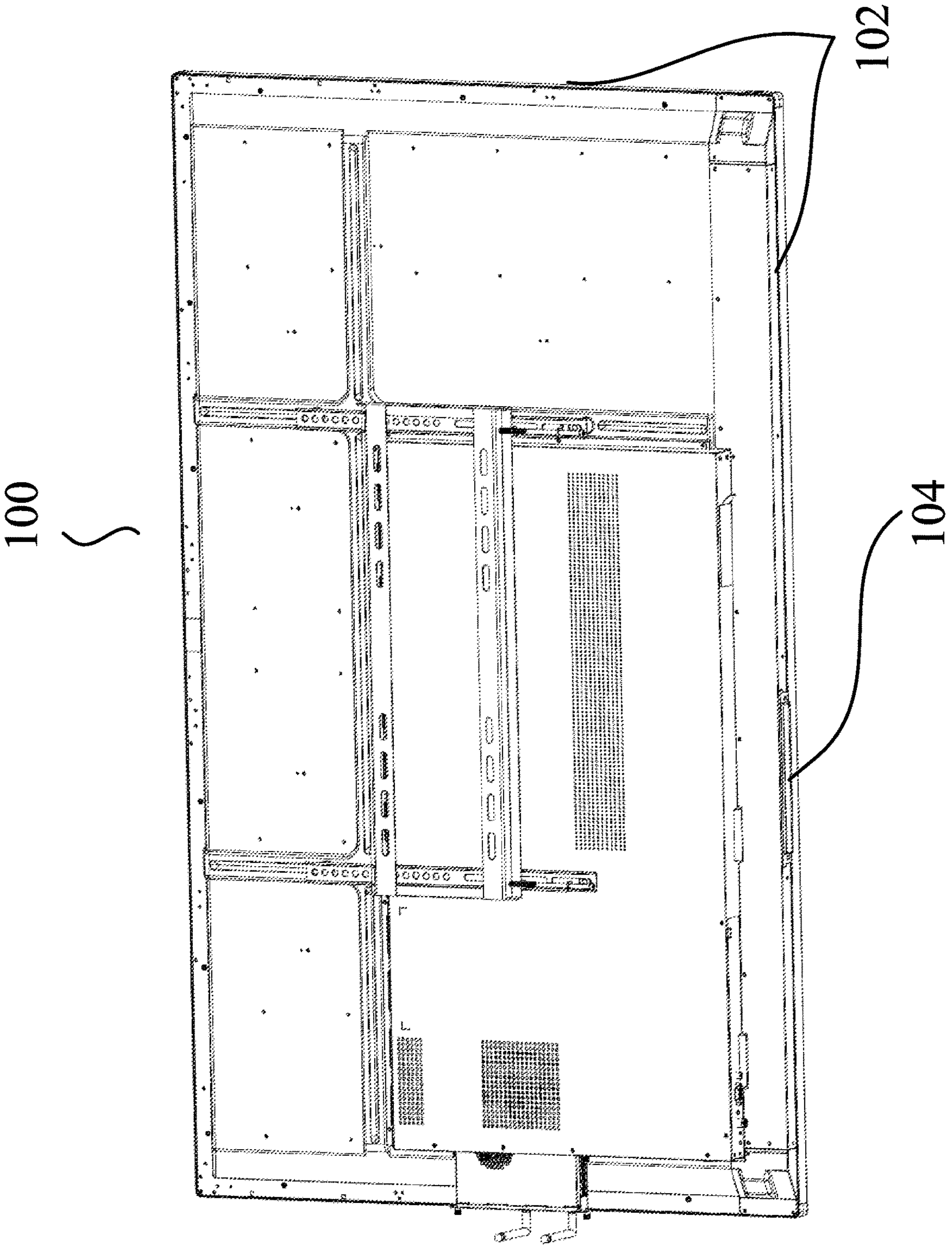
FIG. 9 is a schematic diagram of a back structure of the electronic device in the present disclosure.
Figure 10:
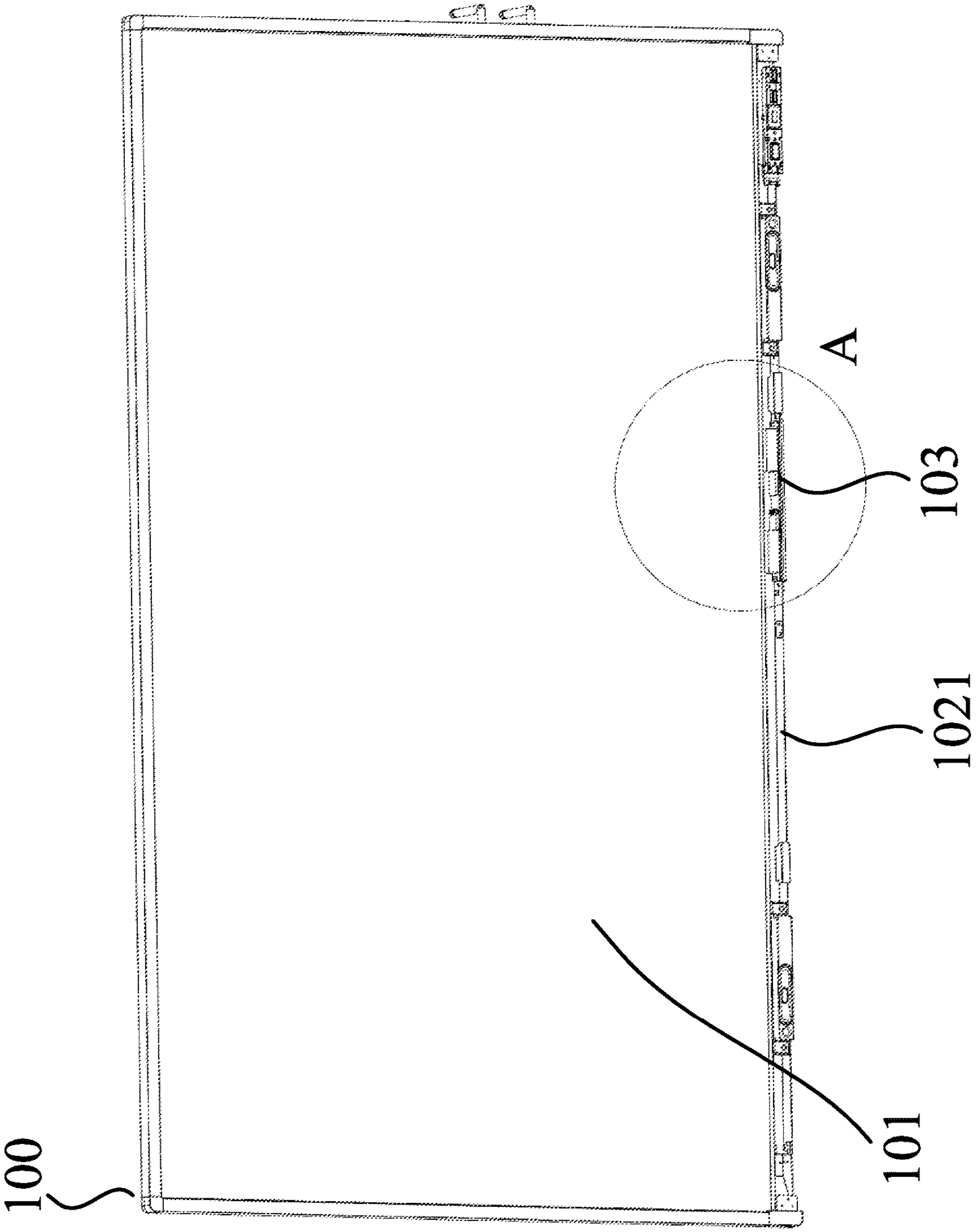
FIG. 10 is a partially exploded schematic diagram at an installation position of the antenna assembly in the embodiment of the present disclosure.
Figure 11:
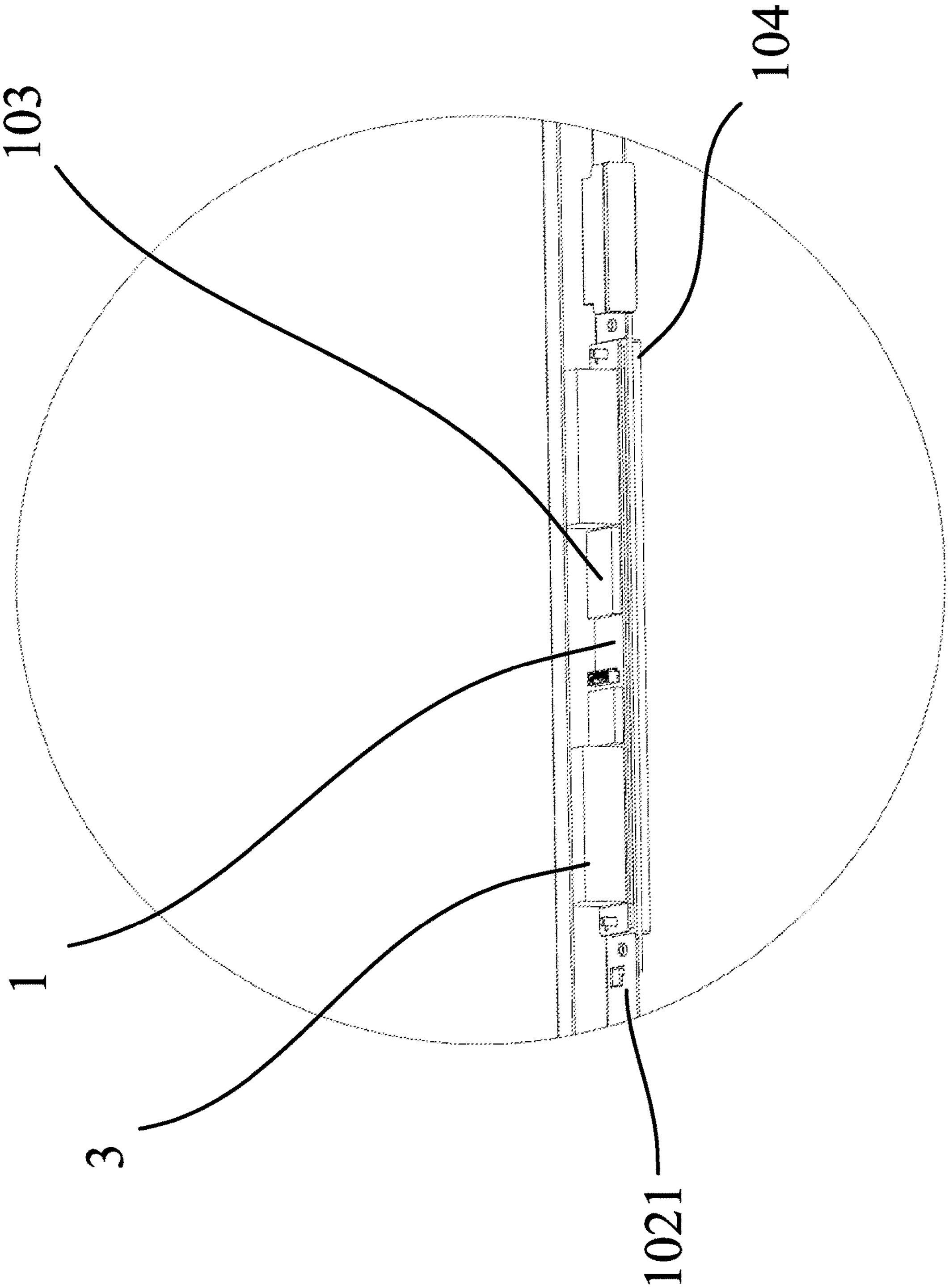
FIG. 11 is an enlarged schematic diagram of Part A in FIG. 10.
Figure 12:
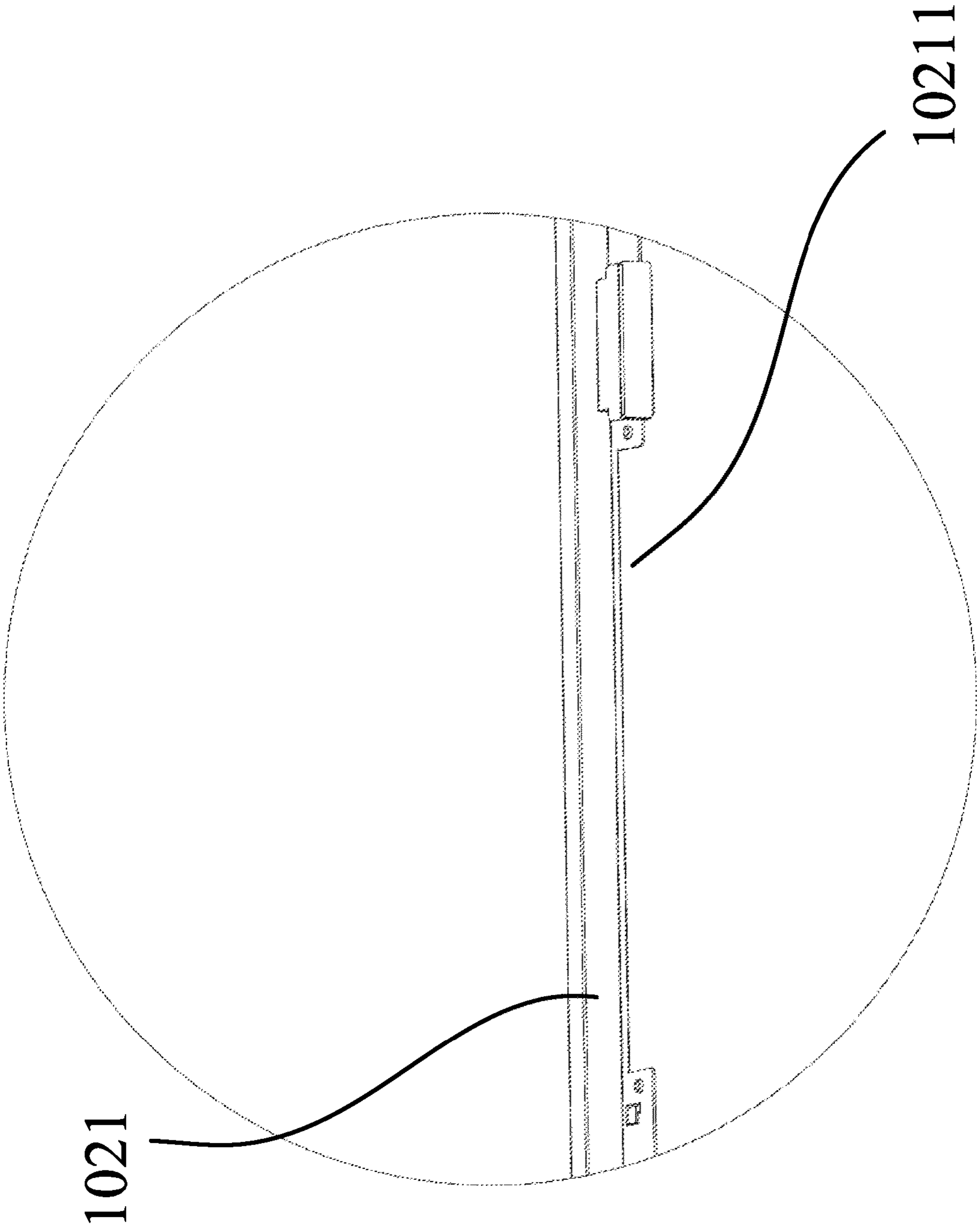
FIG. 12 is a schematic diagram of a pocket hole of a lower frame in Part A in FIG. 10.

As shown in FIGS. 8-10, an embodiment of the present disclosure provides an electronic device 100. The electronic device 100 includes a display screen 101, a frame 102 arranged around the display screen 101, and at least one antenna assembly 103 provided by the examples of the present disclosure. The antenna assembly 103 is located in the electronic device 100 and connected with the frame 102. Thereinto, a surface of the dielectric substrate in the antenna assembly 103 without a metal shielding cover faces the frame 102, that is, the antenna assembly 103 radiates electromagnetic waves to the outside of the electronic device 100.

Specifically, the display screen 101 can be one of LCD, LED, OLED, and other displays. The frame 102 can be a frame surrounding the periphery of the display screen 101. The frame 102 has a certain thickness in the direction perpendicular to the direction of the display screen 101, so that the antenna assembly 103 can be installed on the frame 102. In an embodiment, the number of antenna assemblies 103 can be one or more.

In the electronic device of embodiments of the present disclosure, the antenna unit and the radio frequency chip of the antenna assembly are arranged on the same dielectric substrate, and a metal shielding cover is provided, the antenna assembly is located in the electronic device and connected with the frame, and a surface of the dielectric substrate in the antenna assembly without the metal shielding cover faces the frame. Firstly, the metal shielding cover is arranged on the surface of the dielectric substrate facing away from the antenna unit and covers the antenna unit, which can isolate, through the metal shielding cover, electromagnetic interference to the antenna unit caused by other electronic equipment of the electronic device. Secondly, the antenna unit and the radio frequency chip are arranged on the same dielectric substrate, which avoids the use of a coaxial cable to connect the antenna unit and the radio frequency chip, thereby fundamentally solving the problem of electromagnetic interference to the antenna unit and ensuring the radiation performance of the antenna unit. Thirdly, the metal shielding cover is arranged on the surface of the dielectric substrate facing away from the antenna unit, and after the antenna assembly is installed on the electronic device, the electromagnetic wave radiated by the antenna unit to a direction of the metal shielding cover is shielded by the metal shielding cover, and the electromagnetic wave radiated by the antenna unit radiates to the outside of the electronic device. Thus, the electromagnetic wave radiated by the antenna unit will not interfere with the display screen and cause the display screen to flash, nor will it interfere with other electronic equipment inside the electronic device. Finally, other electronic equipment in electronic devices does not need to be equipped with shielding covers, which reduces the manufacturing cost of electronic device.

Further, the number of antenna units in the antenna assembly can be one or more, the antenna unit and the radio frequency chip can be arranged on the same surface or different surfaces of the dielectric substrate, and the electronic device can select the antenna assembly according to the installation space, radiation performance, and radiation direction of the antenna assembly.

As shown in FIGS. 9-12, in an embodiment, the frame 102 of the electronic device 100 includes a lower frame 1021. The antenna assembly 103 is detachably connected with the lower frame 1021, and a surface of the dielectric substrate 1 of the antenna assembly 103 without a metal shielding cover 3 faces the bottom surface of the lower frame 1021. Specifically, a material of the lower frame 1021 can be metal, and the bottom surface of the lower frame 1021 is provided with a pocket hole 10211 which is directly opposite to the antenna assembly 103, so that after the antenna assembly 103 is installed on the lower frame 1021, the surface of the dielectric substrate 1 of the antenna assembly 103 without the metal shielding cover 3 is directly opposite to the pocket hole 10211. The antenna unit on the antenna assembly 103 can radiate electromagnetic waves to the outside of the electronic device 100 through the pocket hole 10211. Obviously, the antenna assembly 103 can also be installed on other frames of the electronic device 100. For example, it can be installed on the left frame or the right frame. The surface of the dielectric substrate 1 in the antenna assembly 103 without the metal shielding cover 3 can also be in the same direction as the front surface of the display screen 101. The embodiment of the present disclosure does not limit the installation position and orientation of the antenna assembly 103.

The antenna assembly of the embodiment of the present disclosure is located in the lower frame of the electronic device, and the surface of the dielectric substrate 1 in the antenna assembly without a metal shield faces the bottom surface of the lower frame. For one thing, the lower frame has enough installation space to facilitate the installation of the antenna assembly. For another, the lower frame of the electronic device is closer to the user, and the antenna assembly is located in the lower frame with a wide radiation area, which improves the performance of the wireless network of electronic devices.

In one embodiment, the electronic device 100 further includes a decorative part 104. The decorative part 104 covers the pocket hole 10211 to prevent the pocket hole 10211 from directly exposing the dielectric substrate 1 of the antenna assembly 103, so that the electronic device 100 has a good appearance.

In the explanation of this description, the description with reference to the terms "embodiment," "example," etc. means that the concrete feature, structure, material. or characteristic described in conjunction with the embodiment or example is included in at least one embodiment or example of the present application. In this description, the schematic representation of the above-mentioned terms does not necessarily refer to the same embodiment or example.

In addition, it should be understood that although this description is described in accordance with the implementations, each implementations may include more than one technical solution. This description in the present application is only for clarity of the device, those skilled in the art should regard the description as a whole, and the technical solutions in the various embodiments can also be appropriately combined to form other implementations that can be understood by those skilled in the art.

The technical principle of the present disclosure is described above in combination with concrete embodiments. These descriptions are only for the purpose of explaining the principles of the present disclosure and cannot be interpreted in any way as limiting the claimed scope of the present disclosure. Based on the explanation herein, those skilled in the art can associate other concrete embodiments of the present disclosure without creative labor, which will fall within the claimed scope of the present disclosure.

What is claimed is:

1. An antenna assembly, comprising:

a dielectric substrate;

an antenna unit, being arranged on the dielectric substrate; and a radio frequency chip, being arranged on the dielectric substrate, and connected with the antenna unit, wherein the dielectric substrate is provided with a coplanar waveguide transmission line, and the radio frequency chip and the antenna unit are connected through the coplanar waveguide transmission line, wherein the coplanar waveguide transmission line comprises a coplanar waveguide fed and a coplanar waveguide ground plane, the antenna unit is connected with the radio frequency chip through the coplanar waveguide fed, and the antenna unit is grounded through the coplanar waveguide ground plane.

2. The antenna assembly according to claim 1, wherein the coplanar waveguide ground plane is located on both sides of the coplanar waveguide fed.

3. The antenna assembly according to claim 2, wherein the antenna unit comprises a first antenna unit and a second antenna unit, the radio frequency chip comprises a first radio frequency chip, and the coplanar waveguide fed comprises a first coplanar waveguide fed and a second coplanar waveguide fed; and the first antenna unit and the second antenna unit are located on a same side of the first radio frequency chip, the first antenna unit is located between the second antenna unit and the first radio frequency chip, the first antenna unit is connected with the first radio frequency chip through the first coplanar waveguide fed, and the second antenna unit is connected with the first radio frequency chip through the second coplanar waveguide fed.

4. The antenna assembly according to claim 3, wherein both the first coplanar waveguide fed and the second coplanar waveguide fed are provided with impedance matching circuits.

5. The antenna assembly according to claim 3, wherein a shielding ground plane is provided between the first antenna unit and the second antenna unit.

6. The antenna assembly according to claim 3, wherein the first coplanar waveguide fed is located on a side of the first antenna unit close to the first radio frequency chip, and is perpendicular to a bottom side of the dielectric substrate, and the coplanar waveguide ground plane comprises a first coplanar waveguide ground plane on both sides of the first coplanar waveguide fed;

the first antenna unit comprises a first feeding stub and a first short-circuited stub that are perpendicular to the first coplanar waveguide fed, the first short-circuited stub and the first feeding stub have an equal length and are parallel and spaced apart, the first short-circuited stub is connected to the first coplanar waveguide ground plane, the first feeding stub is connected with the first coplanar waveguide fed, the first short-circuited stub is connected with an end of the first feeding stub away from the first coplanar waveguide fed through a first stub, an L-shaped stub is further arranged between the first short-circuited stub and the first feeding stub, an end of the L-shaped stub is perpendicularly connected to the first short-circuited stub, and the other end of the L-shaped stub is perpendicularly connected to the first stub; and the first short-circuited stub is further provided with a first parasitic stub, the first parasitic stub is perpendicular to the first short-circuited stub, and parallel to and spaced apart from the first stub, and the first parasitic stub extends from an end of the first short-circuited stub away from the first coplanar waveguide fed to a direction of the bottom side of the dielectric substrate.

7. The antenna assembly according to claim 6, wherein the second coplanar waveguide fed is parallel to the bottom side of the dielectric substrate, and the coplanar waveguide ground plane further comprises a second coplanar waveguide ground plane located on both sides of the second coplanar waveguide fed;

the second antenna unit comprises a square main body, the square main body is provided with a second short-circuited stub extending to the second coplanar waveguide ground plane, and a second feeding stub extending to the second coplanar waveguide fed, the second short-circuited stub and the second feeding stub are parallel and spaced apart, the second short-circuited stub is arranged away from the first radio frequency chip, and the second feeding stub is arranged close to the first radio frequency chip;

the square main body is further provided with a second stub and a third stub that extend from the square main body to a direction of the first antenna unit, the second stub and the third stub are parallel and spaced apart, the second stub is arranged close to the second coplanar waveguide fed, and the third stub is arranged away from the second coplanar waveguide fed; and the third stub is provided with a second parasitic stub, the second parasitic stub is located on a side of the third stub away from the second coplanar waveguide fed, and parallel to and spaced apart from the third stub, and the second parasitic stub extends from an end of the third stub away from the square main body to a direction of the square main body.

8. The antenna assembly according to claim 6, wherein the second coplanar waveguide fed is parallel to the bottom side of the dielectric substrate;

the second antenna unit comprises a square main body, two corners of the square main body away from an end of the second coplanar waveguide fed are respectively provided with a second stub and a third stub, the second stub is located on a side of the square main body away from the first radio frequency chip, the third stub is located on a side of the square main body close to the first radio frequency chip, the second stub is parallel to the second coplanar waveguide fed and extends from the square main body to a direction away from the square main body, and the third stub is perpendicular to the second coplanar waveguide fed and extends in a direction towards the second coplanar waveguide fed;

an end of the second stub away from the square main body is provided with a fourth stub extending towards the second coplanar waveguide fed, the fourth stub is further provided with an L-shaped fed, the L-shaped fed is located between the fourth stub and the square main body, an end of the L-shaped fed is connected with the fourth stub, and the other end is connected with the second coplanar waveguide fed; and an end of the third stub close to the second coplanar waveguide fed is provided with a second parasitic stub, the second parasitic stub extends from an end of the third stub close to the second coplanar waveguide fed to a direction away from the first radio frequency chip, and the second parasitic stub is parallel to the second stub.

9. The antenna assembly according to claim 3, wherein the antenna unit further comprises a third antenna unit and a fourth antenna unit, the radio frequency chip further comprises a second radio frequency chip, and the coplanar waveguide fed further comprises a third coplanar waveguide fed and a fourth coplanar waveguide fed; and the second radio frequency chip is located on a side of the first radio frequency chip away from the first antenna unit, the third antenna unit and the fourth antenna unit are located on a side of the second radio frequency chip away from the first radio frequency chip, the third antenna unit is located between the second radio frequency chip and the fourth antenna unit, the third antenna unit and the first antenna unit are mirror images of each other, the fourth antenna unit and the second antenna unit are mirror images of each other, the third antenna unit is connected with the second radio frequency chip through the third coplanar waveguide fed, and the fourth antenna unit is connected with the second radio frequency chip through the fourth coplanar waveguide fed.

10. The antenna assembly according to claim 3, wherein the antenna unit further comprises a third antenna unit and a fourth antenna unit, the radio frequency chip further comprises a second radio frequency chip, and the coplanar waveguide fed further comprises a third coplanar waveguide fed and a fourth coplanar waveguide fed; and the second radio frequency chip is located on a side of the first radio frequency chip away from the first antenna unit, the third antenna unit and the fourth antenna unit are located between the second radio frequency chip and the first radio frequency chip, the third antenna unit has a same structure as the first antenna unit, the fourth antenna unit has a same structure as the second antenna unit, the third antenna unit is located between the second radio frequency chip and the fourth antenna unit, the third antenna unit is connected with the second radio frequency chip through the third coplanar waveguide fed, and the fourth antenna unit is connected with the second radio frequency chip through the fourth coplanar waveguide fed.

11. The antenna assembly according to claim 1, wherein the dielectric substrate is provided with a microstrip transmission line, and the antenna unit and the radio frequency chip are connected through the microstrip transmission line.

12. The antenna assembly according to claim 11, wherein the microstrip transmission line is provided with an impedance matching circuit.

13. The antenna assembly according to claim 1, wherein the antenna unit and the radio frequency chip are arranged on a first surface of the dielectric substrate.

14. The antenna assembly according to claim 13, further comprising:

a metal shielding cover, being arranged on a second surface of the dielectric substrate facing away from the antenna unit, and in alignment with a location of the antenna unit on the dielectric substrate, wherein a distance from a bottom portion of the metal shielding cover to the antenna unit is equal to one fourth of a wavelength of an electromagnetic wave radiated by the antenna unit.

15. The antenna assembly according to claim 1, wherein the antenna unit and the radio frequency chip are arranged on opposite surfaces of the dielectric substrate.

16. An electronic device, wherein the electronic device comprises a display screen, a frame arranged around the display screen, and an antenna assembly, wherein the antenna assembly comprises:

a dielectric substrate;

an antenna unit, being arranged on a first surface of the dielectric substrate; and a radio frequency chip, being arranged on the first surface of the dielectric substrate, and connected with the antenna unit, wherein the antenna assembly is located in the electronic device and connected with the frame, and the first surface of the dielectric substrate of the antenna assembly, wherein the dielectric substrate is provided with a coplanar waveguide transmission line, and the radio frequency chip and the antenna unit are connected through the coplanar waveguide transmission line, wherein the coplanar waveguide transmission line comprises a coplanar waveguide fed and a coplanar waveguide ground plane, the antenna unit is connected with the radio frequency chip through the coplanar waveguide fed, and the antenna unit is grounded through the coplanar waveguide ground plane.

17. The electronic device according to claim 16, wherein the frame comprises a lower frame, the antenna assembly is detachably connected with the lower frame, and the first surface of the dielectric substrate of the antenna assembly faces a bottom surface of the lower frame.

18. The electronic device according to claim 17, wherein the bottom surface of the lower frame is provided with a pocket hole directly opposite to the antenna assembly.

19. The electronic device according to claim 18, wherein the electronic device also comprises a decorative part, and the decorative part covers the pocket hole.

20. The electronic device according to claim 16, further comprising:

a metal shielding cover, being arranged on a second surface of the dielectric substrate facing away from the antenna unit, and in alignment with a location of the antenna unit on the dielectric substrate.

* * * * *